United States Patent [19]
Williams

[11] 3,864,615
[45] Feb. 4, 1975

[54] ELECTRONIC PROGRAMMER FOR MULTI-PHASE MOTOR

[75] Inventor: Lee A. Williams, Santa Ana, Calif.

[73] Assignee: Royal Industries, Inc., Pasadena, Calif.

[22] Filed: Sept. 13, 1971

[21] Appl. No.: 179,867

[52] U.S. Cl.............. 318/696, 318/685, 318/138
[51] Int. Cl. ........................................ H02k 37/00
[58] Field of Search ............ 318/696, 685, 138, 939

[56] References Cited
UNITED STATES PATENTS

| | | | |
|---|---|---|---|
| 3,461,365 | 8/1969 | Newland et al. | 318/685 |
| 3,586,953 | 6/1971 | Markkanen | 318/685 |
| 3,609,500 | 9/1971 | Causer | 318/696 |
| 3,614,580 | 10/1971 | Eto | 318/696 |
| 3,621,358 | 11/1971 | Hinrichs | 318/696 |

Primary Examiner—G. R. Simmons
Attorney, Agent, or Firm—Christie, Parker & Hale

[57] ABSTRACT

A system has a multi-phase motor which includes a rotatable shaft and a stator comprising a multi-phase winding arranged in a star configuration. The rotatable shaft rotates either clockwise or counterclockwise in accordance with a rotating magnetic field generated by energizing the windings in prescribed sequences. A programmer device provides signals for controlling the sequence of energizing the windings. The programmer includes a plurality of bistable devices arranged to form a register having twice as many states as the stator has windings. The register provides the signals for controlling the energization of the windings and also provides signals to a circuit for detecting the direction in which the shaft is being controlled to rotate.

14 Claims, 8 Drawing Figures

ELECTRONIC PROGRAMMER FOR MULTI-PHASE MOTOR

CROSS-REFERENCE TO RELATED APPLICATION

The present invention provides an improvement in the system disclosed in application Ser. No. 882,035, filed Dec. 4, 1969 entitled POWER SUPPLY by J. J. Adler and assigned to the assignee of the present invention and now U.S. Pat. No. 3,706,924.

BACKGROUND OF THE INVENTION

1. Field of the Invention

This invention relates to a power supply and programmer therefor and in particular an electronically programmed power supply particularly adapted for use with a control rod drive for a nuclear reactor.

2. Description of the Prior Art

In a control rod drive mechanism for a nuclear reactor it is generally desirable for positioning the control rod within the nuclear vessel to generate a rotating magnetic field in a motor and then translate the resultant rotary mechanical motion to linear mechanical motion. Various types of electrical drive motors have been used for this purpose. Electronic power supplies have been designed for energizing the drive motors and have used triggerable elements therein, such as silicon controlled rectifiers.

The prior art system disclosed in the application cross-referenced above provides an electronic gated power supply for the production of a rotating magnetic field and one that produces a rotating magnetic field causing steps or increments of 15 mechanical degrees rather than 30° as in earlier prior art systems. The gated power supply is operable to provide single polarity direct current to each winding of the motor independently of the others whereas earlier prior art systems have used a pair of opposite polarity voltage sources for driving related pairs of windings. A programmer device provides signals of the proper sequence for energizing the motor windings. The programmer device includes a motor driving a shaft position encoder disk and various light bulbs and photo sensors which produce signals as the disk rotates. This arrangement is bulky, failure prone and of course subject to wear because of the continual rotation of the mechanical members and because the light bulbs burn out.

SUMMARY OF THE INVENTION

The present invention provides an improved programmer for a system having a gatable power supply for the production of a rotating magnetic field in a multi-phase motor.

In the preferred embodiment the stator of the motor has six independently energizable windings. The rotor of the motor moves in either direction in accordance with predetermined sequences of energization of the windings. The predetermined sequences are such that whenever two of the windings are energized the next step in the sequence results in three of the windings being energized. Six binary storage devices are arranged in a register. Of the 64 possible states in a six-stage register only 12 are allowed and means are provided for sensing the existence of a forbidden state and for automatically restoring the register to one of its 12 allowable states. Each of the 12 states corresponds to a particular energization condition for the 6 windings. Thus the register has twice as many allowable states as there are windings in the motor.

A multi-rate clock provides clocking signals to sequence the register through each of its 12 states. Means are provided which respond to the sequencing of the register to supply an indication of its sequencing direction. Additional means register a count representative of the net number of state changes made by the register in one direction so as to indicate the magnitude of the rotation of the motor shaft.

DETAILED DESCRIPTION

Figure 1:
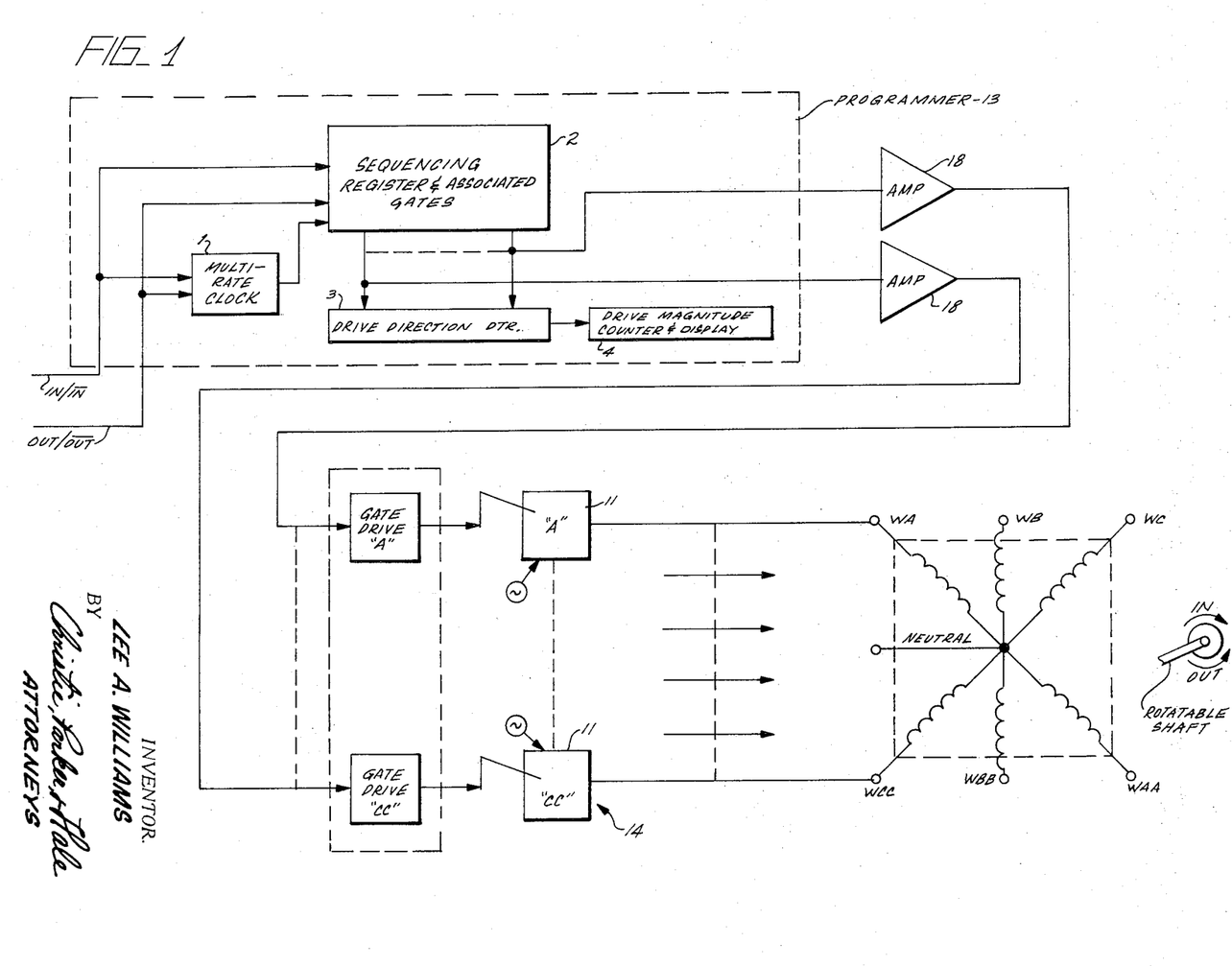
FIG. 1 is a block and schematic diagram of the power supply and electronic programmer therefor embodying the present invention.

FIG. 1 is an overall block diagram of a system including the programmer of the present invention. In the preferred embodiment the system includes a motor having a rotatable shaft and a stator comprising six windings arranged in a star configuration. Preferably the motor is a four-pole six-phase reluctance motor, although other types of motors such as a "mag-jac" motor could be used. The windings of the stator are identified by the reference characters WA, WB, WC, WAA, WBB, and WCC. A neutral winding is provided and each stator winding is energizable independently of the others. When used in a control drive mechanism for a nuclear reactor, the motor shaft is coupled through a worm gear (not shown) or the like to convert the rotary motion of the shaft into translatory motion to drive a control rod either into or out of the nuclear reactor so as to control the heat generated therein.

The energizable stator windings are energized by a direct current provided by the triggerable direct current source indicated generally at 14. The windings are energized and deenergized in a predetermined sequential fashion, either in a clockwise or counterclockwise direction depending upon the desired direction of the control rod.

The direct current power source 14 includes a plurality of triggerable elements 11 that are gated to maintain them in conduction for a preselected interval and in accordance with the desired sequence for energizing the windings WA through WCC. A plurality of gate drives A through CC are provided for supplying a triggering signal to the triggerable elements 11. Application Ser. No. 882,035 which is cross-referenced above, and which discloses in detail the construction and operation of the gate drives and the triggerable elements is incorporated herein by reference.

For purposes of explaining the present invention it needs only to be pointed out that each of the triggerable elements 11 is operative to supply single polarity direct current to a respective one of the energizable windings WA through WCC while receiving an enabling or triggering signal from a corresponding gate drive. As described in the above-referenced patent, preferably each triggerable element 11 comprises six silicon control rectifiers (SCR) (not shown herein) arranged in a full wave rectifying circuit configuration. Thus there are a total of 36 SCR's in groups of six. Each SCR has an anode electrode, a cathode electrode and a gate electrode which is responsive to a triggering pulse to enable conduction from the anode electrode to the cathode electrode. In the full wave rectifying circuit configuration each group of six SCR's have their cathode electrodes connected together and to a respective winding for supplying direct current therethrough to the neutral. Also, each group of six SCR's have their gate electrodes connected together and to a corresponding gate drive. Each group of six SCR's have their six respective anode electrodes connected to a respective phase of a multi-phase alternating current source indicated schematically in FIG. 1. Thus while a triggering signal is applied by any one of gate drives to its corresponding triggerable element, the six SCR's therein respond to full wave rectify the multi-phase alternating current signal and supply the rectified signal to the respective winding.

The gate drives are connected to a programmer 13 that, among other things, provides a series of control signals that trigger the elements 11 in the correct sequence for driving the motor.

The programmer provides drive signals for sequentially energizing the stator windings in a three-on, two-on, three-on, etc. sequence. The energization of the stator windings in this preselected sequence causes the generation of a rotating magnetic field. In the four-pole, six-phase reluctance motor, the sequence of energization is effected in 12 electrical steps. Each electrical step represents a rotation of 30 electrical degrees of the magnetic field and a rotation of 15 mechanical degrees of the motor shaft. Chart I below illustrates the sequence of drive signals for energization of the windings for rotating the shaft one-half revolution to cause the control rod to move inwardly in the nuclear reactor and for rotating the shaft one-half revolution to cause the control rod to move outwardly in the nuclear reactor.

The programmer 13 receives binary command signals indicating the desired direction of movement of the control rod. The source of the command signals is not shown but could be panel switches or the like on a control console. The command signal IN/$\overline{IN}$ is a +8V or high signal when it is desired to move the control rod inwardly and in a 0V or low signal otherwise. The command signal OUT/$\overline{OUT}$ is a +8V or high signal when it is desired to move the control rod outwardly and is a 0V or low signal otherwise. Thus the coincidence of a low signal on the IN/$\overline{IN}$ command input and a low signal on the OUT/$\overline{OUT}$ command input orders the programmer 13 to stop sequencing the motor so as to hold the control rod stationary. Preferably, a conventional interlock system (not shown) is provided to prevent a simultaneous command of both inward and outward movement.

The programmer 13 includes a sequencing register and associated gates shown as block 2 in FIG. 1. The register 2 comprises a plurality of binary storage devices and is arranged to have 12 phase defining states each corresponding to one of the 12 steps illustrated in Chart I above. Thus the number of phase defining states is two times the number of independently energizable windings.

A multi-rate clock 1 is connected to the register 2 to provide clocking signals to cause the register to sequence through its phase defining states while an IN or an OUT command is present. The multi-rate clock is connected to be responsive to the IN and OUT command signals. While a hold condition is indicated by the coincidence of a low IN signal and a low OUT signal the multi-rate clock does not provide clocking signals to the register. Whenever either the IN or the OUT command signal goes high the multi-rate clock responds by providing four clocking pulses at a first repetition rate called a jog rate and thereafter provides clocking pulses at a second, higher repetition rate called a regular rate. This feature of changing the repetition rate is provided so that the motor shaft will rotate at a slow rate initially. After the motor shaft has begun to rotate the increased repetition rate of the clocking signals causes the motor shaft to rotate more rapidly. Thus a smooth start is provided for the motion of the control rod drive.

Figure 7:
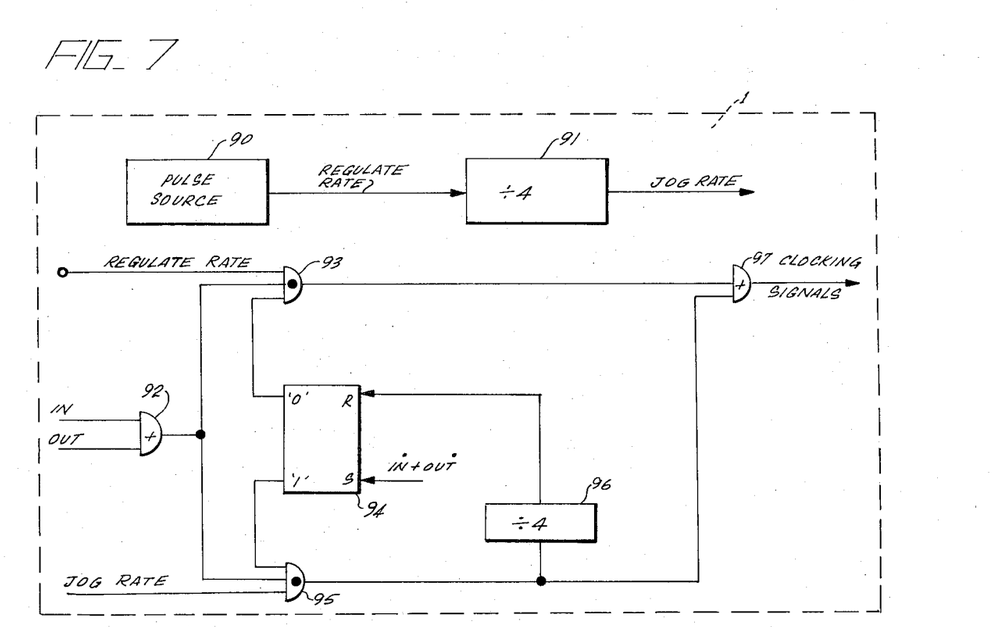
FIG. 7 is a block diagram of the multi-rate clock of FIG. 1.

The multi-rate clock 1 is shown in more detail in FIG. 7. A pulse train source 90 shown as a block continuously produces a constant repetition rate pulse train identified as regulate rate. In the preferred embodiment pulse source 90 includes conventional circuitry such as a Schmitt trigger circuit and a divide by four flip-flop counter which are connected to a 60 Hz power source and produce responsive thereto a 15 pulse per second (pps) signal. A conventional flip-flop counter

CHART I

| | Steps | | | | | | Drive Signals | | | | | |
|---|---|---|---|---|---|---|---|---|---|---|---|---|
| | In | | | | | | | | | | | Out |
| 1 | AB | | | | | | | | | | | AB |
| 2 | ABC | | | | | | | | | | CC | AB |
| 3 | BC | | | | | | | | | | CC | A |
| 4 | BC | AA | | | | | | | | BB | CC | A |
| 5 | C | AA | | | | | | | | BB | CC | |
| 6 | C | AA | BB | | | | | AA | BB | CC | | |
| 7 | | AA | BB | | | | | AA | BB | | | |
| 8 | | AA | BB | CC | | | C | AA | BB | | | |
| 9 | | | BB | CC | | | C | AA | | | | |
| 10 | | | BB | CC | A | | BC | AA | | | | |
| 11 | | | | CC | A | | BC | | | | | |
| 12 | | | | CC | A | B | A B | C | | | | |

91 divides the regulate rate signal by four to produce the jog rate signal.

A flip-flop 94 serves as a switch which controls whether the regulate rate or the jog rate is transferred to the register 2 as a clocking signal.

In accordance with the state of flip-flop 94 regulate rate pulses are transmitted by an AND gate 93 or jog rate pulses are transmitted by an AND gate 95. In addition, whenever it is desired to hold the control rod stationary, neither the jog rate nor the regulate rate signals are transmitted. To that end an OR gate 92 provides a high signal while either the IN or the OUT commands are high and provides a low signal to inhibit the AND gates 93 and 95 while both the IN and the OUT commands are low. An OR gate 97 is responsive to the AND gates 93 and 95 and produces the clocking signals which are coupled to the register 2. A counter counts the first four jog rate pulses and then causes the flip-flop 94 to be reset. The flip-flop 94 is set each time a transition occurs from a hold command to either an IN or an OUT command. This is indicated in FIG. 7 by the symbol IN + OUT at the S or set input to the flip-flop 94.

As shown in FIG. 1, the programmer 13 also includes a drive direction detector 3 which is responsive to the phase changes of the register 2 to provide an indication of the direction in which the register 2 is sequencing the motor shaft. A drive magnitude counter and display four counts pulses produced by the detector 3 to provide an indication of the amount of distance through which the control rod has been ordered to move.

Figure 2:
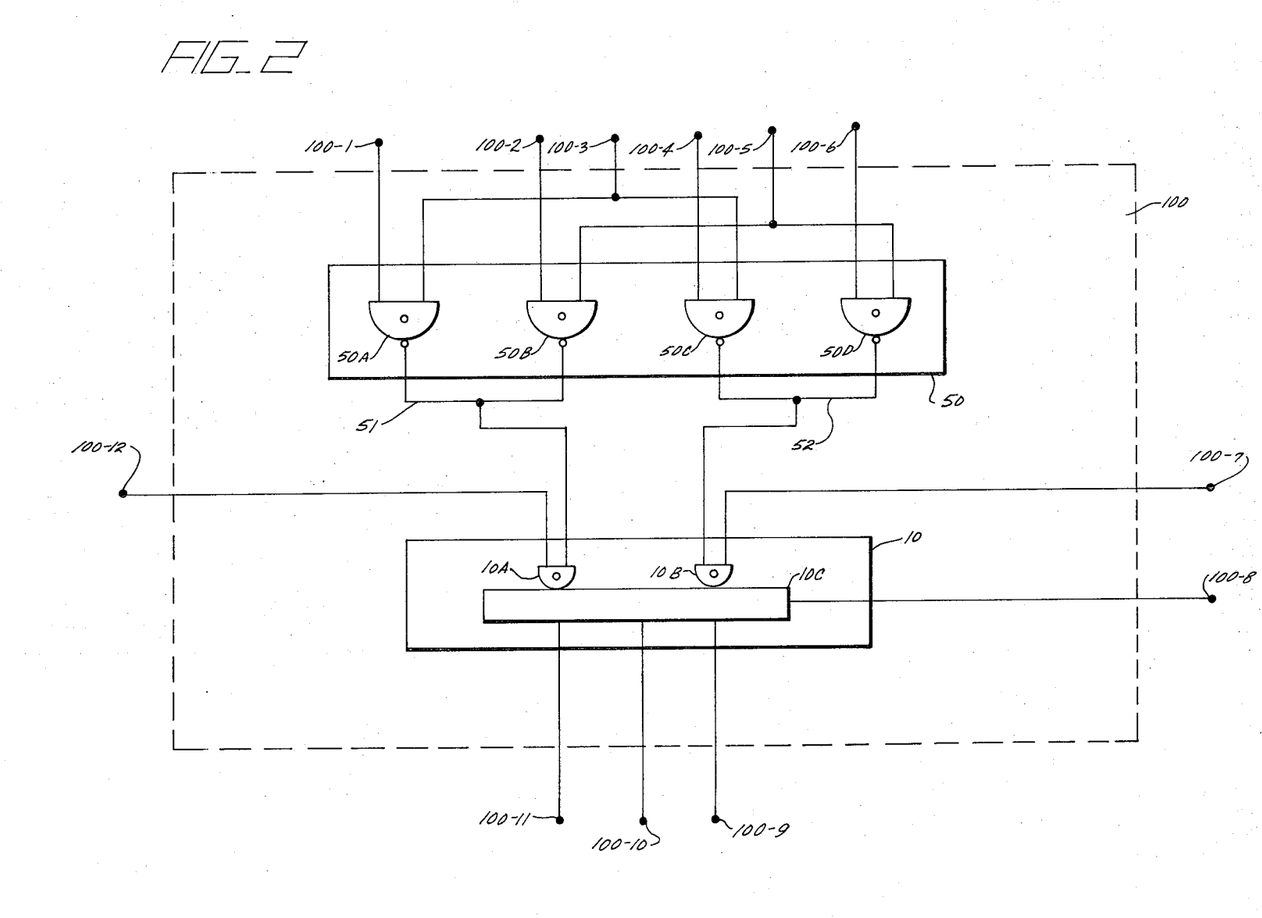
FIG. 2 is a logic block diagram of a register element used as a building block in the register 2 of FIG. 1.
Figure 3:
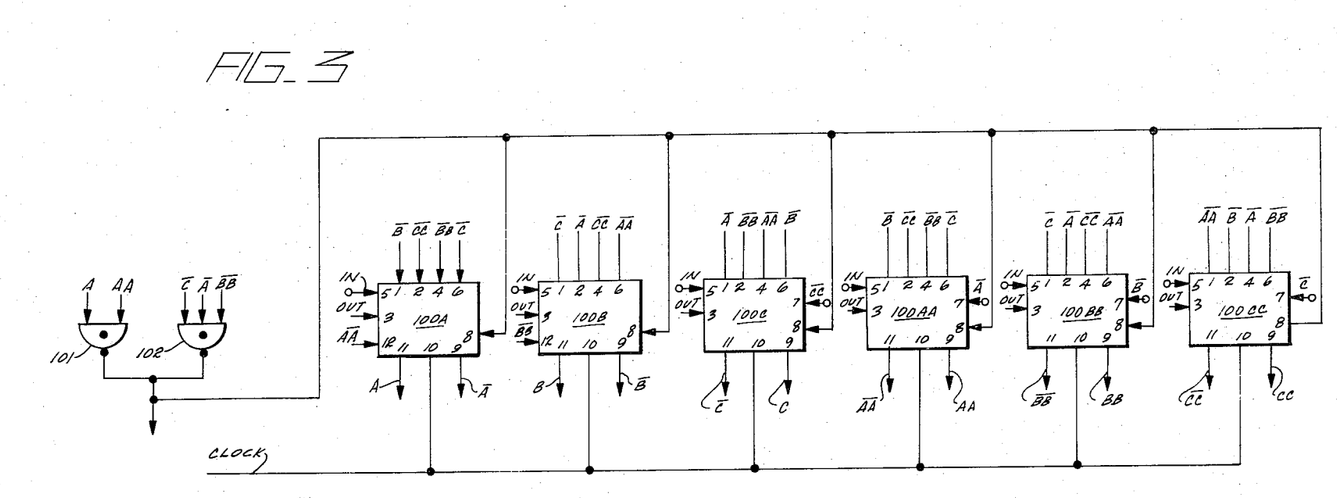
FIG. 3 is a block diagram illustrating the interconnection of the register elements of FIG. 2 to form the register 2.

FIG. 2 shows the internal details of a register element 100. Six register elements 100 are interconnected as indicated in FIG. 3 to form the register 2.

Each register element 100 includes an integrated circuit multi-gate chip 50 and an integrated circuit flip-flop chip 10.

The chip 50 comprises four positive logic NAND gates 50A, 50B, 50C and 50D. Each NAND gate in the chip 50 has two input signal terminals and a single output signal terminal. The NAND gates are of a type in which their output signal terminals can be directly connected together in what is called a wired AND, NAND gate configuration. Such an integrated circuit chip is commercially available from the Semiconductor Division of the Motorola Corporation and is sold under the designation MC668P. When the chip is powered by a +15V power supply (not shown), its logical levels are approximately +8V for a high or logical "1" and 0V for a low or logical "0". Depending upon the logical levels at its input terminals, each NAND gate either draws current into its output terminal to cause the voltage thereon to be brought down to the 0V level or does not draw current into its output terminal and thereby permits the voltage thereon to remain at the +8V level.

As shown in FIG. 2 the NAND gates 50A and 50B are connected together in the wired AND, NAND gate configuration. Thus a direct connection 51 is made between the output terminals of the NAND gates 50A and 50B. One input terminal of NAND gate 50 forms terminal 100-1 of the register element and its other input terminal is connected to terminal 100-3 of the register element. One input terminal of NAND gate 50B forms terminal 100-2 of the register element and its other input terminal is connected to terminal 100-5 of the register element.

A Boolean equation defining the operation of NAND gates 50A and 50B is as follows:

$$g = \overline{(a \cdot b)} \cdot \overline{(c \cdot d)}$$

where $a$, $b$, $c$, and $d$ represent the logical levels of signals applied to the terminals 100-1, 100-3, 100-2, and 100-5 respectively, and $g$ represents the logical level of the signal at the output signal connection 51.

The NAND gates 50C and 50D are also connected in the wired AND, NAND gate configuration. Thus a direct connection 52 is made between the output terminals of the NAND gates 50C and 50D. One input terminal of NAND gate 50C forms terminal 100-4 of the register element and its other input terminal is connected to terminal 100-3 of the register element. One input terminal of NAND gate 50D forms terminal 100-6 of the register element and its other input terminal is connected to terminal 100-5 of the register element.

The chip 10 is a flip-flop circuit which is compatible with the above-described NAND gates. Such a flip-flop circuit is commercially available from the Semiconductor Division of the Motorola Corporation and is sold under the designation MC664P. The chip 10 has internal two-input AND gates 10A and 10B and an internal bistable circuit 10C. One input terminal of the chip 10 forms terminal 100-10 of the register element and receives a clocking signal from the multi-rate clock 1 (FIG. 1). One output terminal of the chip 10 forms terminal 100-9 of the register element. The internal bistable circuit 10C produces either a high or a low signal on the terminal 100-9 depending upon its present state. A second output terminal of the chip 10 forms terminal 100-11 of the register element. The internal bistable circuit 10C produces on terminal 100-11 the logical complement of the signal produced on terminal 100-9.

One input terminal of the AND gate 10A forms terminal 100-12 of the register element and its other input terminal is connected to the connection line 51. When neither one of the input terminals of AND gate 10A are held low and a negative going transition occurs at the clocking input terminal 100-10, the state of the bistable circuit 10C following the transition is such that a high signal is produced on terminal 100-11 and a low signal is produced on terminal 100-9. It should be noted that if terminal 100-12 floats (i.e. is not connected to a source of potential) the AND gate 10A is partially enabled and a high signal on the connection line 51 will fully enable the AND gate 10A. Alternatively, a high signal applied to the terminal 100-12 and a high signal applied to the connection line 51 also fully enables the AND gate 10A.

One input terminal of the AND gate 10B forms terminal 100-7 of the register element and its other input terminal is connected to the connection line 52. When neither one of the input terminals of AND gate 10B are held low and a negative going transition occurs on the clocking input terminal 100-10, the state of the bistable circuit 10C following the transition is such that a high signal is produced on the terminal 100-9 and a low signal is produced on the terminal 100-11. Terminal 100-7, like terminal 100-12, can be either floated or connected to a source of a high signal for partially enabling the associated AND gate 10B.

An input terminal of the chip 10 forms terminal 100-8 of the register element. Whenever a low signal is applied to terminal 100-8, the bistable circuit 10C is forced to assume the state wherein a high signal is produced on terminal 100-11 irrespective of the signals applied to the other input terminals of the chip 10.

The register element has a set state and a reset state with reference to the output terminal from which a drive signal is derived. Register element 100A and 100B (FIG. 3) have drive signal output terminals 100A-11 and 100B-11 respectively, and each is in its set state while producing a high signal on its drive signal output terminal. Register elements 100A and 100B have complementary signal output terminals 100A-9 and 100B-9 respectively and each is in its reset state while producing a high signal on its complementary signal output terminal. On the other hand, register elements 100C, 100AA, 100BB, and 100CC (FIG. 3) have drive signal output terminals 100C-9 through 100CC-9 and the complementary signal output terminals 100C-11 through 100CC-11. Each of the latter four register elements is in its set state while producing a high signal on its −9 terminal and in its reset state while producing a high signal on its −11 terminal.

Furthermore, the gates 50A, 50B, and 10A function as either set gates or reset gates depending upon which output terminal is used for the drive signal. In register elements 100A and 100B, the gates 50A, 50B, and 50C function as set gates. In the other four register elements, they function as reset gates. Similarly, the gates 50C, 50D, and 10B function as reset gates in register elements 100A and 100B and as set gates in the other four register elements.

Figure 4A:
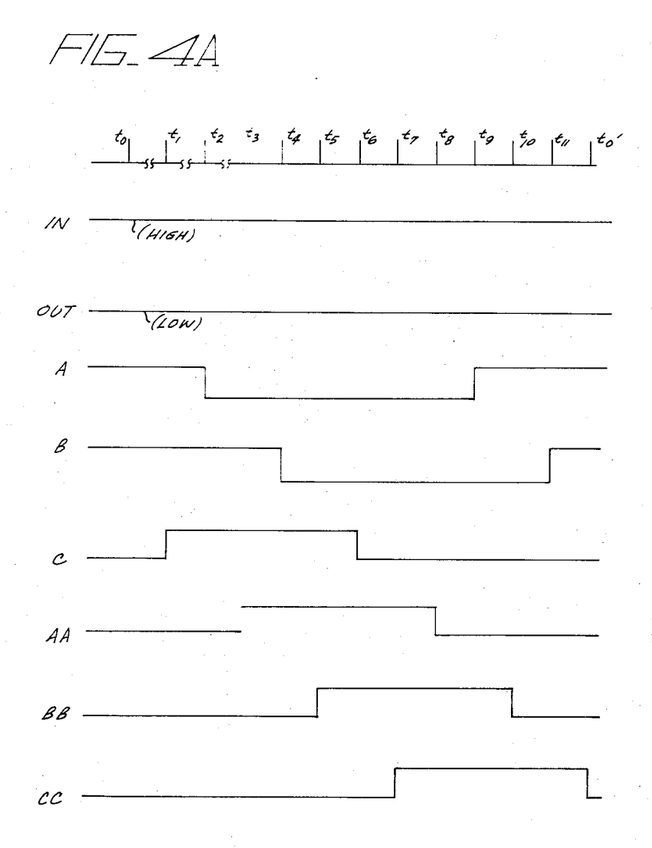
FIG. 4 comprises FIG. 4A and 4B and illustrates with waveform diagrams two examples of operation of the register 2.
Figure 4B:
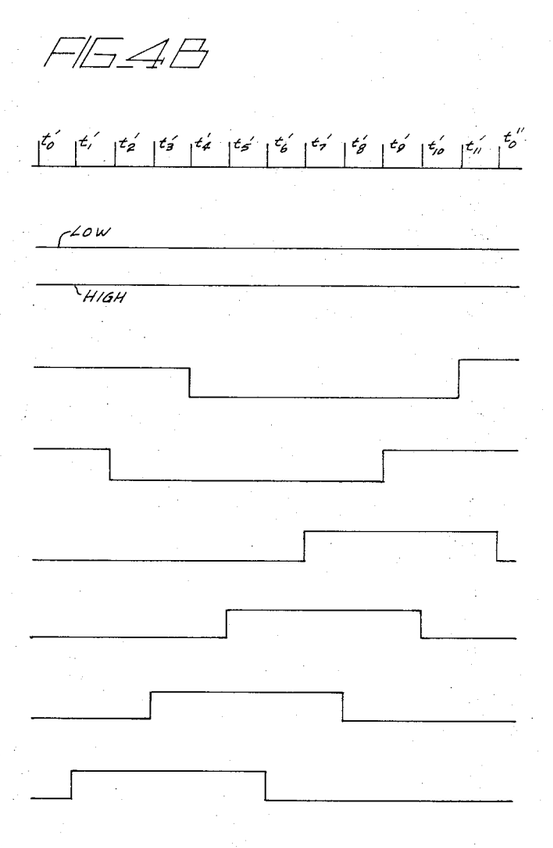

Consider now FIGS. 3 and 4. FIG. 4 comprises FIGS. 4A and 4B which are waveform diagrams illustrating two examples of operation of the register 2 shown in FIG. 3.

The register 2 comprises six of the register elements 100 shown in FIG. 2 which are identified in FIG. 3 as 100A, 100B, 100C, 100AA, 100BB, and 100CC. Each register element produces a drive signal output and a complementary output. The waveforms A and B shown in FIG. 4 are produced as the drive signal outputs of register elements 100A and 100B on terminals 100A-11 and 100B-11 respectively. The complementary output signals $\overline{A}$ and $\overline{B}$ are produced on terminals 100A-9 and 100B-9 respectively. The waveforms C, AA, BB, and CC are produced as drive signal outputs on terminals 100C-9 through 100CC-9 respectively. The complementary signals $\overline{C}$ through $\overline{CC}$ are produced on terminals 100C-11 through 100CC-11 respectively.

Each of the six register elements is connected to receive as inputs the complementary signals of the other five register elements. The interconnecting wiring between the register elements is not illustrated for clarity.

For purposes of explanation the register elements can be considered as arranged in a circle wherein each register element has a register element to its left and another register element to its right. Considered in this manner, register element 100CC is one position to the left of register element 100A and register element 100B is one position to its right.

The set gates of each register element have one input connected to the complementary output of the register element, one position to its left and another input connected to the complementary output of the register element one position to its right. As will be explained in greater detail hereinafter, this interconnection provides for the shifting of a high signal from one register element to another. The reset gates of each register element have one input connected to the complementary output of the register element four positions to its left and another input connected to the complementary output of the register element four positions to its right. As will be explained in greater detail hereinafter, this interconnection provides for the shifting of a low signal from one register element to another.

Consider now the operation of register element 100A in connection with the example of operation illustrated by the waveforms of FIG. 4. As indicated in FIG. 3, the following signals are applied to the terminals of register element 100A: 1) $\overline{B}$ to 100A-1; 2) $\overline{CC}$ to 100A-2; 3) OUT to 100A-3; 4) $\overline{BB}$ to 100A-4; 5) IN to 100A-5; 6) $\overline{C}$ to 100A-6; and 7) $\overline{AA}$ to 100A-12. Thus the set gate 50A within register element 100A is responsive to $\overline{B}$ which is derived from the register element one position to the right. The set gate 50B within register element 100A is responsive to $\overline{CC}$ which is derived from the register element one position to the right. The reset gate 50C within register element 100A is responsive to $\overline{BB}$ which is derived from the register element four positions to the right. The reset gate 50D is responsive to $\overline{C}$ which is derived from the register element four positions to the left. The set gate 10A within register element 100A is connected to receive the $\overline{AA}$ signal which serves as an enable signal for shifting a high signal into register element 100A.

As shown in FIG. 4A, during the time intervals $t_0 - t_0'$ the IN signal is high and the OUT signal is low. Since the OUT signal is low, the NAND gate 50A within register element 100A does not force its connection line 51 to be low. Thus the line 51 is free to go high whenever either one of the inputs to NAND gate 50B is low. Since the IN signal is high throughout the intervals $t_0 - t_0'$, the line 51 goes high only during interval $t_7 - t_0'$ while the $\overline{CC}$ signal is low. It should be noted during this interval $t_7 - t_0'$ the register element 100CC which is one position to the left of register element 100A is in its set state and is producing a high signal as its drive signal output. This high signal is shifted into register element 100A under the control of the shift enable signal $\overline{AA}$. This shifting occurs as follows: The AND gate 10A within register element 100A is partially enabled by the high signal on the line 51 during the interval $t_7 - t_0'$. The internal AND gate 10A is fully enabled during the interval $t_8 - t_0'$ by virtue of the coincidence of a high signal on the line 51 and a high signal received from $\overline{AA}$. Thus the clock pulse occurring at time $t_9$ sets the register element 100A and the A signal changes from a low to a high level. The other clock pulses occurring during the interval in which the AND gate 10A is fully enabled do not affect the A signal because it is already high.

While the OUT signal is low, the NAND gate 50C does not force the line 52 to be low. Thus the line 52 is free to go high whenever either one of the inputs to NAND gate 50D is low. Since the IN signal is high throughout the interval $t_0 - t_0'$, the line 52 within register element 100A is high only during the interval $t_1 - t_6$ while the $\overline{C}$ signal is low. It should be noted that during this interval $t_1 - t_6$ the register element 100C which is four positions to the left of register element 100A is in its set state and is producing a high signal on its drive signal output. This high signal causes a shift of a low into the register element 100A. This shifting occurs as follows:

The AND gate 10B within register element 100A is fully enabled during the interval $t_1 - t_6$ because during this interval neither of its input terminals is held low. Thus the clock pulse occurring at time $t_2$ resets the register element 100A and the A signal changes from a high to a low level.

The other clock pulses occurring during the interval in which AND gate 10B is fully enabled do not have any effect on the A signal because it is already low.

As shown in FIG. 4B, during the interval $t_0'$ to $t_0''$ the OUT signal is high and the IN signal is low. While the IN signal is low, the NAND gate 50B does not force the line 51 to be low. Thus the line 51 is free to go high whenever either one of the inputs to NAND gate 50A is low. Since the OUT signal is high throughout the interval $t_0' - t_0''$ the line 51 goes high only during the intervals $t_0' - t_2'$ and $t_9 - t_c''$ while the $\overline{B}$ signal is low. Thus the AND gate 10A is partially enabled during these latter intervals. The AND gate 10A is fully enabled during the interval $t_0' - t_2'$ and $t_{10}' - t_0''$ by virtue of the coincidence of a high signal on the line 51 and a high signal received from $\overline{AA}$. Thus the clock pulse occurring at time $t_{11}'$ causes a change of state to one wherein the A signal produced on the terminal 100-11 is high. The other clock pulses occurring during the intervals in which the AND gate 10A is fully enabled do not affect the A signal because it is already high.

While the IN signal is low the NAND gate 50D does not force the line 52 to be low. Thus the line 52 is free to go high whenever either one of the inputs to NAND gate 50C is low. Since the OUT signal is high throughout the interval $t_0' - t_0''$, the line 52 is high only during the interval $t_3' - t_8'$ while the BB signal is low. The internal AND gate 10B is fully enabled during the interval $t_3' - t_8'$. Thus the clock pulse occurring at time $t_4'$ causes a change of state to one wherein the drive signal A is low. The other clock pulses occurring during the interval in which AND gate 10B is fully enabled do not affect the A signal because it is already low.

The remaining five register elements 100B through 100CC respond to the input signals applied thereto in the same manner a described above in connection with register element 100A.

The set gates in register element 100B are partially enabled by set conditions in either of the adjacent register elements 100A to 100C and respond to shift enable signal $\overline{BB}$ to provide for the setting of register element 100B at time $t_{11}$ in FIG. 4A and at time $t_9'$ in FIG. 4B. The reset gates in register element 100B are enabled by set conditions in either of the register elements 100CC or 100AA and the floating condition of terminal 100B-7 to provide for the resetting of register element at time $t_4$ in FIG. 4A and at time $t_2'$ in FIG. 4B.

The set gates in register element 100C are partially enabled by set conditions in either of the adjacent register elements 100B or 100AA and respond to the shift enable signal $\overline{CC}$ to provide for the setting of register element 100C at time $t_1$ in FIG. 4A and at time $t_7'$ in FIG. 4B. The reset gates in register element 100C are enabled by set conditions in either of the register elements 100A or 100BB and the floating condition terminal 100C-12 to provide for the resetting of register element 100C at time $t_6$ in FIG. 4A and at time $t_0''$ in FIG. 4B.

The set gates in register element 100AA are partially enabled by set conditions in either of the adjacent register elements 100C or 100BB and respond to the shift enable signal $\overline{A}$ to provide for the setting of register element 100AA at time $t_3$ in FIG. 4A and at time $t_5'$ in FIG. 4B. The reset gates in register element 100AA are enabled by set conditions in either of the register elements 100B or 100CC and the float condition of terminal 100AA-12 to provide for the resetting of register element 100C at time $t_8$ in FIG. 4A and at time $t_{10}'$ in FIG. 4B.

The set gates in register element 100BB are partially enabled by set conditions in either of the adjacent register elements 100AA or 100CC and respond to the shift enable signal $\overline{B}$ to provide for the setting of register element 100BB at time $t_5$ in FIG. 4A and at time $t_3'$ in FIG. 4B. The reset gates in register element 100BB are enabled by set conditions in either of the register elements 100C or 100A and the float condition of terminal 100BB-12 to provide for the resetting of register element 100BB at time $t_{10}$ in FIG. 4A and at time $t_8'$ in FIG. 4B.

The set gates in register element 100CC are partially enabled by set conditions in either of the adjacent register elements 100BB or 100A and respond to the shift enable signal $\overline{C}$ to provide for the setting of the register element 100CC at time $t_7$ in FIG. 4A and at time $t_1'$ in FIG. 4B. The reset gates in register element 100CC are enabled by set conditions in either of the register elements 100AA or 100BB and the float condition of terminal 100CC-12 to provide for the resetting of register element 100CC at time $t_0'$ in FIG. 4A and at time $t_6'$ in FIG. 4B.

Each drive signal A through CC is coupled through a conventional amplifier 18 (FIG. 1) to a respective one of the gate drives 12.

It should be noted that it is possible for the register 2 accidentally to enter a forbidden state; that is, a state other than the 12 phase defining states. For example, when power is first applied thereto, the register will assume an arbitrary state. The 12 phase defining states are "reachable" from certain but not all of the forbidden states. For example, the forbidden state wherein only the drive signal A output is high is automatically recoverable from by virtue of the interconnection of the register elements, and the phase defining state wherein both the drive signals A and B are high is said to be reachable therefrom. On the other hand, the register elements by themselves will not recover from a forbidden state wherein both the drive signals A and AA are high. Therefore a NAND gate 101 is provided for sensing any such forbidden state. Similarly, the register elements will not recover from a forbidden state wherein the complementary signals $\overline{C}$, $\overline{A}$, and $\overline{BB}$ are high. Therefore a NAND gate 102 is provided for sensing any such forbidden state. The outputs of NAND gates 101 and 102 are directly connected together and are also connected to the $-8$ terminal of all six register elements. Thus upon sensing any such forbidden state the gates 101 and 102 cause the register 2 to assume the state wherein register elements 100A and 100B are set and register elements 100C through 100CC are reset.

Figure 5:
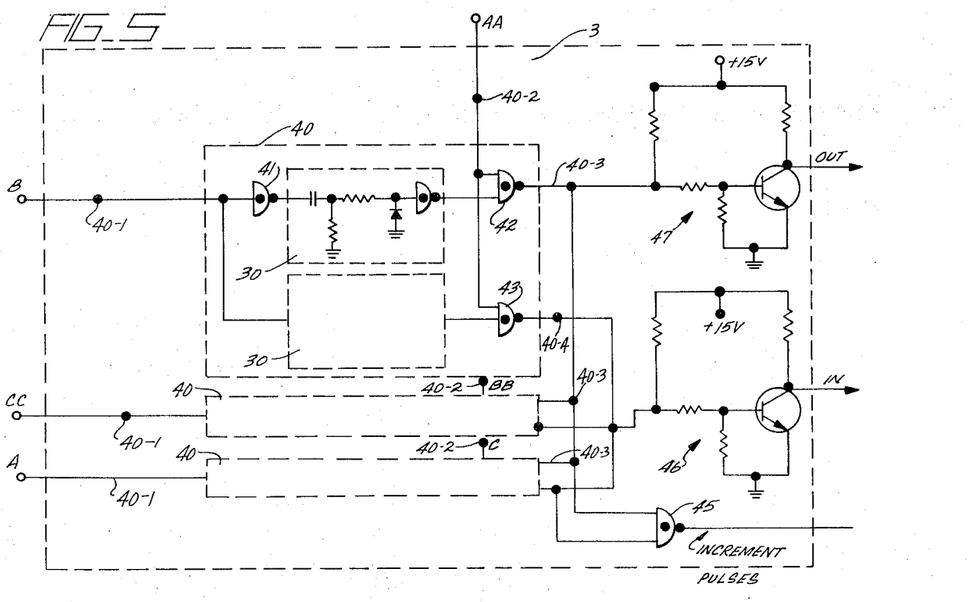
FIG. 5 is a block and schematic diagram of the drive direction detector of FIG. 1.

The drive direction detector 3 is shown within a dashed block in FIG. 5. The detector 3 comprises three identical direction sub-detectors 40. Each sub-detector 40 is responsive to two of the six drive signals A through CC and provides drive direction indication pulses. The drive direction indication pulses from the three sub-detectors are combined together by two gates indicated generally at 47 and 46 which function as OR gates. The outputs of the OR gates 47 and 46 control the operation of the drive magnitude counter 4.

The principle of operation of drive detector 3 will be understood by a consideration of Chart I. The steady state conditions of the drive signals in and of themselves do not provide information concerning direction. However, the transitions of the drive signals combined with particular steady state conditions uniquely indicate drive direction. For example, the steady state condition wherein both the C and AA signal is high occurs in the IN column at step 5 and at step 9 in the OUT column. However the B signal makes a transition from a high to a low between steps 4 and 5 while sequencing in the IN direction but makes a transition from a low to a high between steps 9 and 10 while sequencing in the OUT direction. Furthermore, there is no low to high transition of the B signal while the AA signal is high as the register sequences for the IN direction. Thus the coincidence of a high AA signal and a high to low transition in the B signal unambiguously indicates that the register is sequencing for the IN direction. Similarly there is no high to low transition in the B signal while the AA signal is high as the register sequences for the OUT direction. Thus the coincidence of a high AA signal and a low to high transition in the B signal unambiguously indicates that the register is sequencing for the OUT direction.

A similar analysis of Chart I shows that the coincidence of a high BB signal and a high to low transition in the CC signal unambiguously indicates that the register is sequencing in the OUT direction. The coincidence of a high BB signal and a low to high transition in the CC signal unambiguously indicates that the register is sequencing in the IN direction. The coincidence of a high C signal and a low to high transition in the A signal unambiguously indicates that the register is sequencing in the OUT direction. The coincidence of a high C signal and a high to low transition in the A signal unambiguously indicates that the register is sequencing in the IN direction.

Consider now the detailed operation of the direction detector 3. The drive signal AA is applied to terminal 40-2 of one of the sub-detectors 40 and is connected thereby to one input of a NAND gate 42 and to one input of a NAND gate 43. The other input of NAND gate 42 is connected to receive the output of a transition sensor 30 which produces a positive pulse whenever the drive signal B makes a low-to-high transition. NAND gate 42 responds to the coincidence of a high AA signal and the low-to-high transition of the B signal by driving the output terminal 40-3 to 0V. Thus a low signal is produced on terminal 40-3 to indicate that the register is sequencing for the OUT direction. The other input of NAND gate 43 is connected to receive the output of another transition sensor 30 which produces a positive pulse whenever the drive signal B makes a high to low transition. NAND gate 43 responds to the coincidence of a high AA signal and the high to low transition of the B signal by driving the output terminal 40-4 to 0V. Thus a low signal is produced on terminal 40-4 to indicate that the register is sequencing for the IN direction.

Each transition sensor 30 comprises a conventional resistor-capacitor differentiating circuit and a NAND gate driven by negative-going pulses from the differentiating circuit. A diode provides clamping action at the input of the NAND gate.

A NAND gate 41 is provided for inverting the drive signal B and drives the transition sensor connected to gate 42. The drive signal B is directly connected to the transition sensor connected to gate 43.

The internal details of the other two sub-detectors 40 have not been shown and need not be described because they are merely duplicates of the sub-detector 40 described above.

The terminals 40-3 are connected together and to the input of a conventional transistor inverter stage. Similarly the terminals 40-4 are connected together and to the input of another conventional transistor inverter stage. In addition a two-input NAND gate 45 has an input connected to the terminals 40-3 and an input connected to the terminals 40-4. The NAND gate 45 thus produces a high pulse whenever any one of the three sub-detectors 40 produces a low pulse. It should be noted that as the register sequences through a full cycle in one direction the NAND gate 45 produces three positive pulses. In the preferred embodiment each such positive pulse represents a drive increment of 1/16 inch of the control rod.

Figure 6:
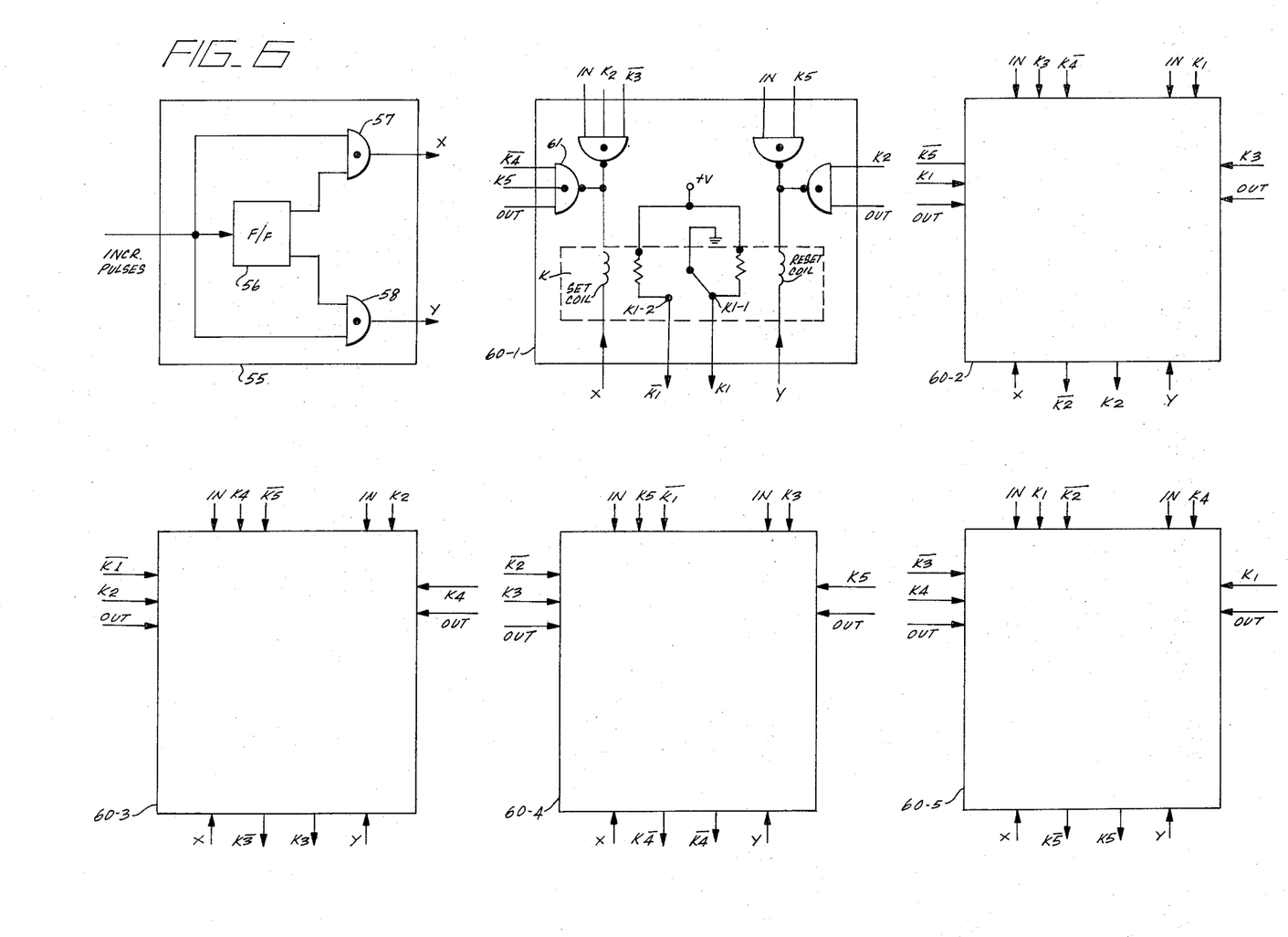
FIG. 6 is a block diagram of the drive magnitude counter of FIG. 1.

The drive magnitude counter is shown in block diagram in FIG. 6. A conventional gating circuit 55 receives increment pulses which are the output pulses of gate 45 (FIG. 5) and produces the output signals X and Y. The output signals X and Y are normally low and alternately go high in response to the increment pulses. The circuit 55 includes a complementing flip-flop 56 triggered by the increment pulses and a pair of AND gates 57 and 58 which are alternately enabled by a respective output side of the flip-flop 56.

Five counting stages 60-1 through 60-5 are arranged to form an up/down counter which registers an indication of the magnitude of the distance through which the control rod has been ordered to move. As the rod moves inwardly, the counter counts up and as the rod moves outwardly the counter counts down. The counter counts in a bi-quinary code.

Each counting stage includes a single pole, double throw magnetic latching relay having a set coil and a reset coil. A pulse of current through the set coil causes the relay to be set such that the pole of the relay which is grounded (0V) makes contact with the −1 contact of the relay. A pulse of current through the reset coil causes the relay to be reset such that the pole of the relay makes contact with the −2 contact.

An important advantage arises from the use of latching relays in the counter. This advantage resides in the fact that the latching relays retain their present state despite a temporary loss of power. This is an important feature, particularly in connection with a control drive mechanism for a nuclear reactor.

Chart II below lists the counting sequence for the up-down counter for both the IN direction and the OUT direction. In the chart the symbols $\overline{K1}$ through $\overline{K5}$ indicate that the respective latching relays within counting stages 60-1 through 60-5 are in their set states and K1 through K5 indicate that the respective latching relays are in their reset state.

CHART II

| | | | | | | |
|---|---|---|---|---|---|---|
| | 0 | K1 | $\overline{K2}$ | $\overline{K3}$ | $\overline{K4}$ | $\overline{K5}$ |
| | 1 | K1 | $\overline{K2}$ | $\overline{K3}$ | $\overline{K4}$ | $\overline{K5}$ |
| IN ↑ | 2 | K1 | K2 | $\overline{K3}$ | $\overline{K4}$ | $\overline{K5}$ |
| | 3 | $\overline{K1}$ | K2 | $\overline{K3}$ | $\overline{K4}$ | $\overline{K5}$ |
| | 4 | $\overline{K1}$ | K2 | K3 | K4 | $\overline{K5}$ |

CHART II-Continued

|     |   | K1 | K2 | K3 | K4 | K5 |
|-----|---|----|----|----|----|----|
| OUT | 5 | $\overline{K1}$ | $\overline{K2}$ | K3 | $\overline{K4}$ | $\overline{K5}$ |
|     | 6 | $\overline{K1}$ | $\overline{K2}$ | K3 | K4 | $\overline{K5}$ |
| ↓   | 7 | $\overline{K1}$ | $\overline{K2}$ | $\overline{K3}$ | K4 | $\overline{K5}$ |
|     | 8 | $\overline{K1}$ | $\overline{K2}$ | $\overline{K3}$ | K4 | K5 |
|     | 9 | $\overline{K1}$ | $\overline{K2}$ | $\overline{K3}$ | $\overline{K4}$ | K5 |

Consider now the operation of counting stage 60-1 which is typical. The latching relay K1 therein has a set coil, a reset coil, and contacts K1-1 and K1-2 which are connectable to ground (0V) by the pole of relay K1. The contacts K1-1 and K1-2 are each connected to a source of positive voltage (indicated schematically as +V) through a respective current limiting resistor. A NAND gate 61 has its output connected to the set coil of the relay K1 and the other end of the set coil is connected to receive the X signal from circuit 55. The NAND gate 61 is operative to draw current into its output terminals upon the coincidence of high OUT, K5 and $\overline{K4}$ signals. The X signal positive pulse sets the relay K1 when the NAND gate 61 is in this operative condition.

The manner in which the other gates in the counting stage respond to their inputs is identical to that described above in connection with NAND gate 61.

In summary, the overall operation of the preferred embodiment of the present invention is as follows. When it is desired to move the control rod further into the nuclear reactor an IN command is supplied to the programmer 13. In response the multirate clock produces four of the jog rate clocking pulses and then produces a continuous stream of the regulate clocking pulses until the IN command is removed. The register 2 responds to the clocking signals to produce driving signals in the predetermined sequence which is appropriate for the IN direction. The gatable power supply responds to the drive signals and supplies direct current to the energizable windings of the stator and thereby generates a rotating magnetic field. In response the motor shaft rotates and its rotation is converted into translatory motion of the control rod.

In addition the drive direction detector 3 responds to the phase transitions of the register 2 to produce increment pulses representative of 1/16 inch drive commands and to produce an indication of the direction for which the register is sequencing.

The up-down counter shown in FIG. 6 responds to the increment pulses to count in the direction indicated by the direction detector 3.

When an OUT command signal is supplied to the programmer the process is reversed. Thus the control rod moves outward and the up/down counter registers the net magnitude of the rod motion.

It should be noted that a number of modifications can be made to the preferred embodiment described in detail above. For example, other types of binary storage devices can be used in lieu of the flip-flop circuits used in the register elements. Furthermore, other types of gating arrangements using AND and OR gates can be used in lieu of the NAND gates used as set and reset gates in the register elements. It should also be noted that additional counting stages can be added to provide for the registering of a larger net number indicative of the magnitude of motor motion. Also, display means such as panel lights can be added for providing a visual indication of the magnitude of motor motion.

What is claimed is:

1. In a system having a multi-phase motor having a stator comprising n independently energizable windings arranged in a preselected winding configuration, a rotatable shaft responsive thereto, and a power supply having n triggerable devices for independently supplying single polarity voltage to the independently energizable windings, a programmer for sequencing the operation of the triggerable devices to power the motor for step-by-step movement of the motor shaft, the programmer including a plurality of binary storage devices arranged to form a register having at least 2n phase defining states each representative of a different shaft position with a first set of n phase defining states indicating that m triggerable devices should supply voltage to the multi-phase motor and with a second set of n phase defining states indicating the m + 1 triggerable devices should supply voltage to the multi-phase motor;

means for sequencing the register through each of the 2n states such that each change from an existing state to a changed state results in the changed state being in a different one of the two sets from the existing state;

means responsive to the register for triggering the triggerable devices in accordance with the indication provided by the register; and counting means responsive to changes of state by the register for providing an indication of the magnitude of motor shaft movement ordered by the programmer.

2. A programmer as defined in claim 1 wherein each binary storage device is a bistable flip-flop circuit.

3. A programmer as defined in claim 2 wherein each flip-flop circuit has a terminal for receiving a clocking signal and at least a pair of terminals for receiving control signals controlling the state which the flip-flop circuit will assume after receiving a clocking signal and wherein the means for sequencing the register includes means for producing substantially equally time spaced-apart clocking signals and a network of logical gating circuits arranged to have a pair of output terminals corresponding to each flip-flop circuit and to produce thereon control signals for controlling the subsequent states of the flip-flop circuits.

4. A programmer as defined in claim 3 including means for producing a control signal for indicating a desired direction of shaft movement and wherein the gating network has an input terminal for receiving the direction control signal and is responsive thereto for controlling the subsequent states of the flip-flop circuits in accordance therewith.

5. A programmer as defined in claim 4 including n flip-flop circuits in the register each corresponding to a respective one of the n triggerable devices and each directly indicating whether its corresponding triggerable device should supply voltage to the multi-phase motor.

6. A programmer as defined in claim 5 wherein the register comprises at least six flip-flop circuits each having a SET state and a RESET state and the gating network is arranged to control the register so that a two-SET, three-SET, two-SET, etc. sequence is produced.

7. A programmer as defined in claim 3 wherein the means for producing clocking signals includes means for initially producing a predetermined number of clocking signals at a first repetition rate and an arbitrary number of clocking pulses at a second, higher repetition rate thereafter so that the motor shaft initially moves at a preselected speed in response to clocking signal at the first repetition rate and then moves at a higher speed in response to the other clocking pulses.

8. A programmer as defined in claim 1 wherein the register comprises at least 6 flip-flop circuits having 12 allowable phase defining states and a plurality of forbidden states; and including means responsive to an existing forbidden state of the register for changing its state to an allowable state.

9. A programmer as defined in claim 8 including a decoder network for indicating an existing forbidden state.

10. A programmer as defined in claim 1 wherein the counting means comprises temporary storage devices which preserve the indication of the magnitude of motor shaft movement despite a temporary loss of power.

11. In a power supply for a multi-phase motor comprising a plurality of independently energizable windings arranged in a star configuration with one winding for each phase, an independent triggerable device corresponding to each winding for supplying direct current therethrough to energize the winding, a programmer connected to the triggerable devices for controlling the energization and de-energization of the multi-phase windings in a preselected sequence,
   a. means for providing a sequence of pulses;
   b. at least four register elements in row, each including
      i. a flip-flop circuit having an input terminal connected to receive the pulses and an output terminal coupled to a respective triggerable device for providing ON and OFF signals for energizing and de-energizing the corresponding winding;
      ii. a set control gating circuit providing a set control signal to the flip-flop circuit in response to the coincidence of an ON signal from an adjacent register element in the row and an OFF signal from a non-adjacent register element in the row;
      iii. a reset control gating circuit providing a reset control signal to the flip-flop circuit in response to a predetermined signal from a non-adjacent register element in the row, wherein the register elements in the row respond to the pulses and the set and reset control signals to provide ON and OFF signals to the triggerable devices in three-ON, two-ON, etc. sequence
   c. means for indicating a desired direction of movement of the shaft of the multi-phase motor and wherein each register element is responsive to the indicated direction for providing ON and OFF signals in either a first or a second sequence in accordance with the indicated direction; and
   d. a gating network including a differentiating circuit for producing a signal indicative of whether the ON and OFF signals are being provided in the first sequence or the second sequence.

12. A programmer as defined in claim 11 wherein the means for providing a sequence of pulses comprises means for producing pulses at a first repetition rate and means for producing pulses at a second repetition rate and means for selecting for transmission to the register elements the pulses at either the first or the second rate.

13. A programmer as defined in claim 12 wherein the multiphase motor comprises six independently energizable windings and wherein six register elements are provided for providing ON and OFF signals to the triggerable devices in the three-ON, two-ON, etc. sequence.

14. A programmer as defined in claim 11 including a means responsive to a predetermined combination of ON and OFF signals produced by the register elements for changing the states of the register elements so as to produce a preselected, different combination of ON and OFF signals.

* * * * *

UNITED STATES PATENT OFFICE
CERTIFICATE OF CORRECTION

PATENT NO. : 3,864,615

DATED : February 4, 1975

INVENTOR(S) : Lee A. Williams

It is certified that error appears in the above-identified patent and that said Letters Patent are hereby corrected as shown below:

| Location in Patent | |
|---|---|
| Col 9 Line 30 | "BB" should read -- $\overline{BB}$ -- |
| Col 9 Line 41 | "a" should read -- as -- |
| Col 12 Line 56 | "$\overline{K1}$ through $\overline{K5}$" should read -- K1 through K5 -- |
| Col 12 Lines 58,59 | "K1 through K5" should read -- $\overline{K1}$ through $\overline{K5}$ -- |
| Col 14 Line 18 | "the" should read -- that -- |

Signed and sealed this 20th day of May 1975.

(SEAL)
Attest:

RUTH C. MASON
Attesting Officer

C. MARSHALL DANN
Commissioner of Patents
and Trademarks